US010545776B1

(12) United States Patent
Kowalski et al.

(10) Patent No.: US 10,545,776 B1
(45) Date of Patent: Jan. 28, 2020

(54) THROUGHPUT AND LATENCY OPTIMIZED VOLUME INITIALIZATION

(71) Applicant: Amazon Technologies, Inc., Seattle, WA (US)

(72) Inventors: Marcin Piotr Kowalski, Seattle, WA (US); Matthew J. Eddey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 15/277,162

(22) Filed: Sep. 27, 2016

(51) Int. Cl.
*G06F 3/06* (2006.01)
*G06F 9/455* (2018.01)

(52) U.S. Cl.
CPC .......... *G06F 9/45558* (2013.01); *G06F 3/064* (2013.01); *G06F 3/067* (2013.01); *G06F 3/0611* (2013.01); *G06F 3/0613* (2013.01); *G06F 3/0632* (2013.01); *G06F 3/0653* (2013.01); *G06F 3/0664* (2013.01); *G06F 2009/45575* (2013.01); *G06F 2009/45583* (2013.01); *G06F 2009/45591* (2013.01)

(58) Field of Classification Search
CPC .................................................. G06F 9/45558
See application file for complete search history.

(56) References Cited

U.S. PATENT DOCUMENTS

2004/0215644 A1* 10/2004 Edwards, Jr. ......... G06F 3/0601
2012/0017114 A1* 1/2012 Timashev ........... G06F 11/1469
714/15
2014/0317394 A1* 10/2014 Buhler .................. G06F 9/4416
713/2
2016/0328242 A1* 11/2016 Manders ............... G06F 9/4416
2018/0018109 A1* 1/2018 Mueller ................ G06F 3/0619

OTHER PUBLICATIONS

Poojary, Nitheesh; Understanding Object Storage and Block Storage Use Cases; Amazon Web Services; https://cloudacademy.com/blog/object-storage-block-storage/; Jul. 20, 2015 (2 pages).
De Leon, Yadin Porter et al; Object Storage versus Block Storage: Understanding the Technology Differences; Druva Blog; https://www.druva.com/blog/object-storage-versus-block-storage-understanding-technology-differences/; Aug. 14, 2014 (7 pages).

* cited by examiner

*Primary Examiner* — Edward J Dudek, Jr.
(74) *Attorney, Agent, or Firm* — Lee & Hayes, P.C.

(57) ABSTRACT

Functionality is disclosed for throughput and latency optimized volume initialization. Data blocks used for boot processes of multiple virtual machine (VM) instances are identified, for example, where the multiple VM instances are created from a specific VM image. A load order document is generated that identifies the data blocks, and also identifies an order in which the data blocks are used for the boot process. The identified data blocks are coalesced to generated a coalesced boot volume. Subsequently, each time a VM instance is created from the specific VM image, the coalesced boot volume (e.g., instead of the individual data blocks) is transmitted from a data store to the a block storage service in the order specified by the load order document. The block storage service exposes a storage volume to the VM instance that can be used to initialize the VM instance.

20 Claims, 9 Drawing Sheets

THROUGHPUT AND LATENCY OPTIMIZED VOLUME INITIALIZATION

Internet or web-based services are increasingly based on multi-tenant cloud-based infrastructure services, also referred to as Infrastructure as a Service ("IaaS") or resource-on-demand services. Resource-on-demand or IaaS services are typically provided by data centers that host large numbers of physical servers and associated resources. The physical servers are commonly managed by virtualization software, which dynamically creates virtual servers for requesting customers. Using virtualization, a single hardware server can host multiple virtual servers. Individual virtual servers are referred to as server instances or virtual machine ("VM") instances, and are created based on VM images that are provided or specified by customers.

While booting, a VM instance commonly accesses a large number of data blocks. Accessing such a large number of data blocks for the boot process can be time consuming and resource intensive. This problem is amplified when a large number of VM instances are instantiated and booted in parallel, or in close succession.

The disclosure made herein is presented with respect to these and other considerations.

DETAILED DESCRIPTION

Figure 1A:
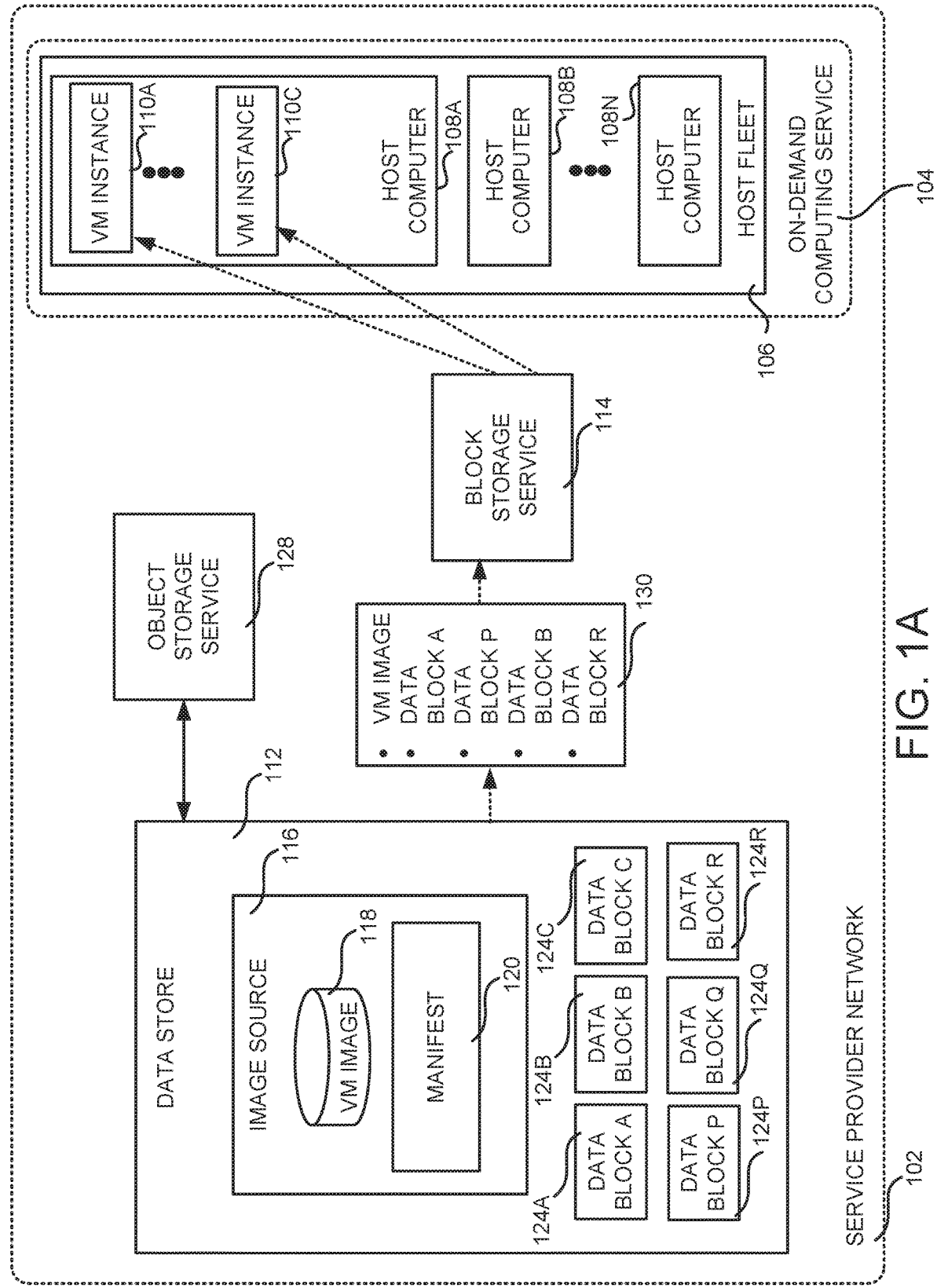
FIGS. 1A-1C are computer system architecture diagrams showing aspects of the configuration and operation of a service provider network configured to coalesce a storage volume for throughput and latency optimized initialization, according to one configuration.

The following detailed description is directed to technologies for throughput and latency optimized volume initialization. Utilizing the technologies described herein, a coalesced storage volume, such as a boot volume used by a VM instance, can be provided from an object storage service to a block storage service in a way that reduces the throughput and latency issues commonly associated with retrieving the blocks of a storage volume from an object storage service.

For example; and without limitation, in one particular configuration the technologies disclosed herein can be utilized to monitor data blocks used by the boot processes of one or more VM instances that are created from a specific VM image. For example, the data blocks used for the boot process of the one or more VM instances are identified, and an order in which these data blocks are used in the boot process is also identified.

A load order document can then be generated, where the load order document identifies the data blocks and also identifies the order in which these data blocks are used for the boot processes of the one or more VM instances. The identified data blocks are then coalesced to form a coalesced boot volume. For example, the data blocks can be concatenated form a coalesced boot volume. In the coalesced boot volume, the identified data blocks are arranged in order identified in the load order document, i.e., arranged in the order in which these data blocks are used for the boot process of the one or more VM instances, Subsequently, when a request to instantiate a VM instance is received, the coalesced boot volume can be provided from an object storage service to a block storage service that exposes the boot volume to the VM instance for booting. Because the volume has been coalesced, the blocks contained in the volume can be provided efficiently to the block storage service to improve throughput.

In an example, hundreds, or even thousands of data blocks have to be accessed during boating a VM instance. If such a large number of data blocks are to be individually accessed from a data store and transmitted to the block storage service individually, a summation of the fixed costs (e.g. connection establishment, I/O costs, etc.) associated with accessing each of the individual data blocks at the object storage service would be relatively large. In contrast, as disclosed herein, by retrieving the coalesced boot volume only once from the object storage service, all the underlying data blocks are retrieved. That is, the fixed costs (e.g. connection establishment) are paid only once (e.g., while retrieving the coalesced boot volume) and yet, all the data blocks for the boot process are retrieved. This dramatically decreases the fixed costs associated with retrieving data blocks for booting the VM instance. Furthermore, the throughput when transmitting the blocks of the boot volume from the object storage service to the block storage service is faster, as all the data blocks are received in the order in which they are likely to be used for booting.

Although the technologies disclosed herein are primarily described in the context of coalescing a boot volume, the technologies disclosed herein can also be utilized to coalesce other types of storage volumes in a similar manner. In this regard, it is to also be appreciated that the coalesced storage volumes described herein can be utilized to initialize the operation of a VM instance in ways other than hooting an operating system. In this regard, it is to be appreciated that the terms "boot" and "booting" as used herein encompass any manner of initializing the operation of a VM instance.

It should also be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the technologies described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which can be referred to herein as a "FIG." or "FIGS.").

Figure 1B:
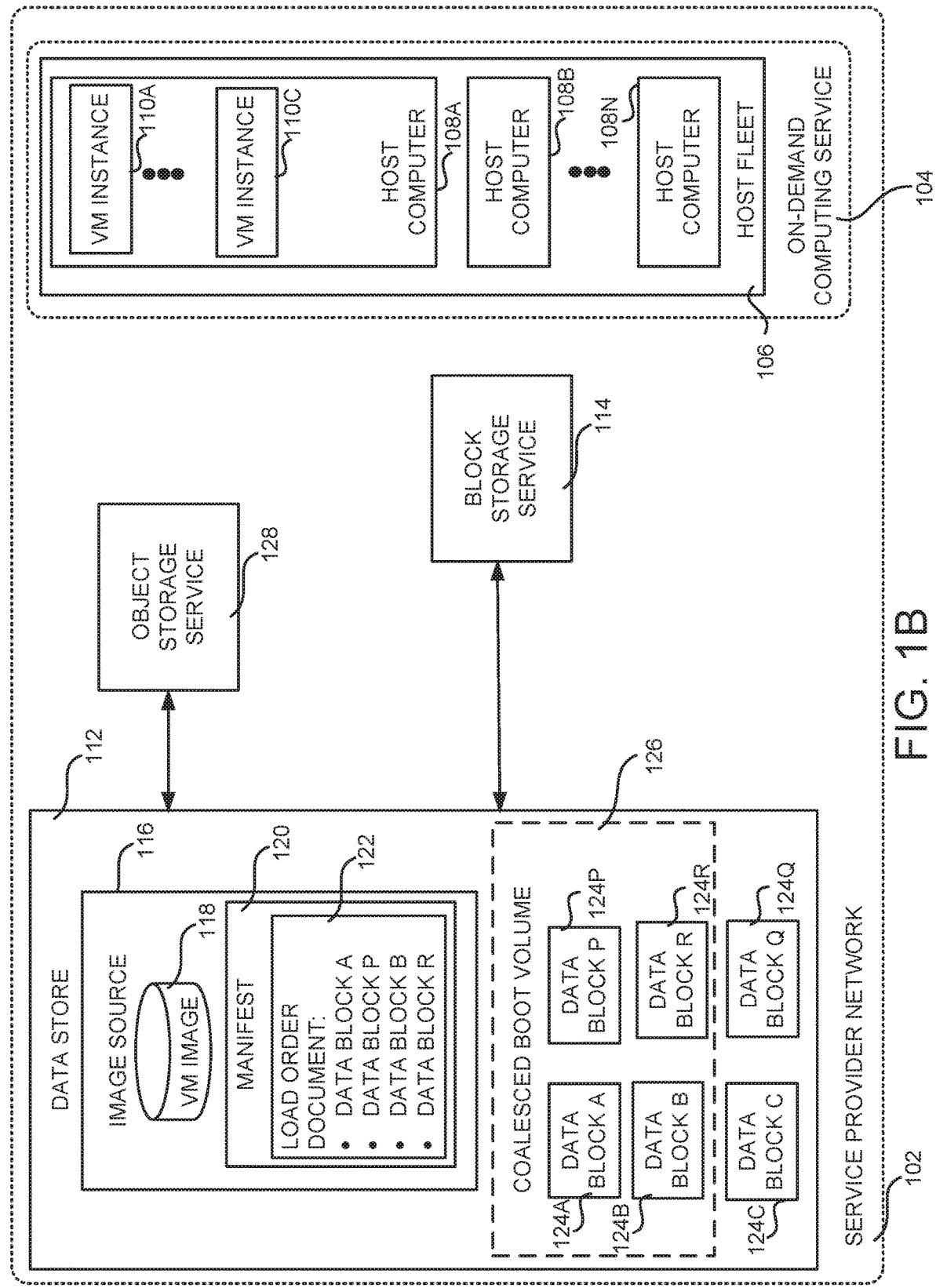
Figure 1C:
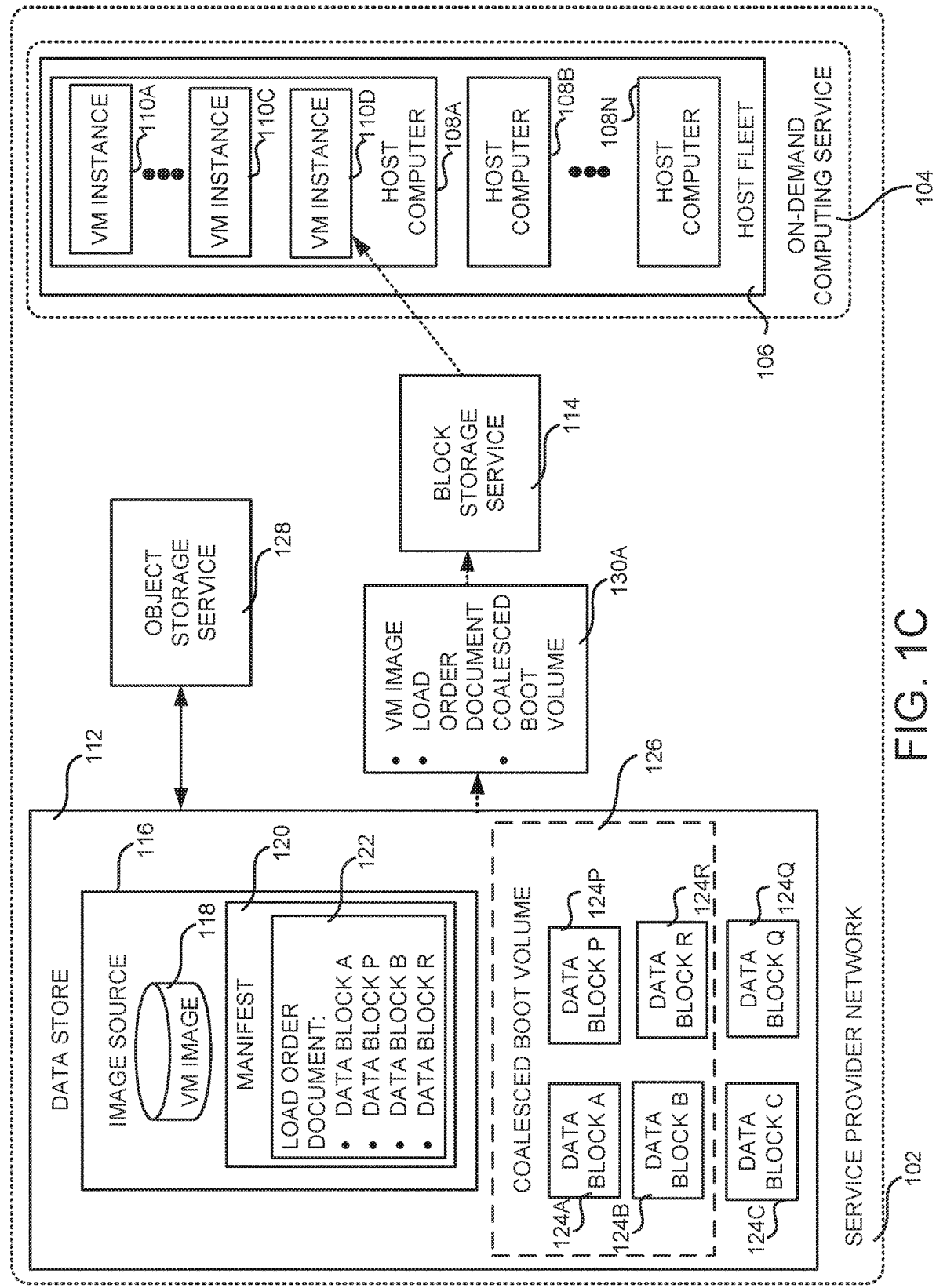

FIGS. 1A-1C are computer system architectures diagram 100 showing aspects of the configuration and operation of a service provider network 102 configured to provide functionality for throughput and latency optimized storage volume initialization. As will be described in greater detail below, the technologies disclosed herein can be utilized to coalesce boot volumes for optimized boot volume retrieval during booting of VM instances hosted in one or more host computers 108A-108C of a host fleet 106. The service provider network 102 is a distributed network through which customers and/or other users can utilize computing resources, such as VM instances 110A-110C (which might be referred herein singularly as "a VM instance 110" or in the plural as "the VM instances 110") and/or other types of computing resources, on a permanent or as-needed basis.

Each type or configuration of a computing resource can be available from the service provider network 102 in different sizes. For example, a service provider might offer physical hosts, VM instances 110 or other types of data processing resources that are available for purchase and use that have many different configurations of processor capabilities, main memory, disk storage, and operating system.

A service provider operating the service provider network 102 might also offer other types of resources for purchase and use by customers. For example, a service provider might offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or services 106 on a permanent or as-needed basis. The resources might also include, but are not limited to, VM instances 110 and images 118, security groups, option groups, gateways, option sets, network access control lists ("ACLs"), subnets, storage buckets, network interfaces, snapshots, spot market requests, and storage volumes.

The resources described above can be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The resources described briefly above might also be provisioned and de-provisioned as needed in an automated fashion. For example, the service provider network 102 might be configured to instantiate a new instance of a computing resource, such as a VM instance 110, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

A customer or potential customer of the service provider network 102 might utilize an appropriate computing system shown in FIG. 1A) to communicate with the service provider network 102 over an appropriate data communications network (also not shown in FIG. 1A). In this way, a customer of the service provider network 102 can configure various aspects of the operation of the computing resources provided by the service provider network 102, or to otherwise control any computing resources being utilized by the customer. For example, and without limitation, a computing system utilized by a customer of the service provider network 102 might be utilized to purchase computing resources in the service provider network 102, to configure aspects of the operation of the computing resources or other type of interface, to access and utilize functionality provided by the various services and systems described herein, and/or to perform other types of functionality with regard to the operation of the computing resources provided by the service provider network 102.

A customer computing system might be any type of computing device capable of connecting to the service provider network 102 via a suitable data communications network such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

As shown in FIG. 1A, an on-demand computing service 104 is utilized in some configurations to provide the VM instances 110. For instance, in the example shown in FIG. 1A, the on-demand computing service 104 includes a host fleet 106 that includes several host computers 108A-108N (which might be referred herein singularly as "a host computer 108" or in the plural as "the host computers 108"). A host computer 108 can execute one or more VM instances 110. In the example of FIG. 1A, the host computer 108A executes VM instances 110A-110C. In this regard, it should be appreciated that the configuration shown in FIG. 1A has been simplified for discussion purposes and that many other host computers can be utilized to provide many other VM instances 110 in a similar fashion. For example, and without limitation, host computers 108B and 108N might be utilized to provide additional VM instances 110. As discussed above, the VM instances 110 can be provisioned and/or de-provisioned based upon demand and/or other factors.

In an example, the service provider network 102 also includes a data store 112 configured to store data for initialization, startup, and/or hooting of the VM instances 110. In an example, the data store 112 can store any other data as well. In an example, an object storage service 128 provides the data store 112. The service provider network 102 further includes a block storage service 114 configured to provide an interface between the data store 112 and the host fleet 106, e.g., to transmit data from the data store 112 to the host fleet 106 to facilitate initialization, startup, and/or booting of the VM instances 110. The block storage service 114 exposes storage volumes to the VM instances 110 that the VM instances 110 can boot from.

The data store 112 stores one or more image sources, e.g., an image source 116. The image source 116 can include or reference a VM image 118. In an example, image source 116 can also include or reference a manifest 120. The manifest 120, for example, includes an inventory of contents of the VM image 118. The manifest 120 can enumerate or identify executable components of the VM image 118. For example, executable components can be identified by their filenames, process identifiers, and/or process names in the manifest 120. The manifest 120 can also indicate characteristics of the identified executable components, such as permissions, capabilities, checksums, sizes, sources, creators, and so forth. In an example, a VM instance can be instantiated or created based on a corresponding VM image. For example, each of the VM instances 110A-110C can be instantiated or created based on the VM image 118.

In an example, the data store 112 can include any other data, e.g., data block A, data block B, data block C, data block P, data block Q, and data block R, labelled respectively as 124A, 124B, 124C, 124P, 124Q, and 124R in FIG. 1A. Although the data store 112 is likely to include a far larger number of data blocks, only six example data blocks A, B, C, P, Q, and R are illustrated in FIG. 1A for purposes of illustrative clarity.

In an example, one or more of the data blocks A, B, C, P, Q, and R can be used to bootstrap (henceforth also referred to as "boot") one or more of the VM instances 110, e.g., used for an initial program load ("IPL") of one or more of the VM instances 110. Thus, each of the VM instances 110A-110C is instantiated or created based on the VM image 118. Once the VM instances 110A-110C are instantiated, the VM instances 110A-110C are to be booted, e.g., to execute a boot loader, a kernel, one or more drivers of the VM instances, and/or to load and execute programs for the boot process of the VM instances. One or more of the data blocks A, B, C, P, Q, and R are used to boot the VM instances 110A-110C.

In an example, the block storage service 114 can act as an interface between the data store 112 and the host computers 108. For example, the block storage service 114 can expose storage volumes to the VM instances 110. In response to requests to access the storage volume, the block storage service 114 can access the data store 112 to retrieve data, and transmit the data to the host computers 108 to instantiate and/or boot the VM instances 110.

In an example, the block storage service 114 (or the host fleet 106) keeps track of the data blocks 124 used for booting the VM instances. For example, the block storage service 114 can keep track of the data blocks 124 used for booting VM instances that are created from a specific VM image (e.g., the VM image 118). In the example of FIG. 1A, each of the VM, instances 110A-110C are created from the VM image 118. Thus, the block storage service 114 keeps track of the data blocks 124 used for booting the VM instances 110A-110C, For example, the block storage service 114 identifies the data blocks 124 used for booting the VM instances 110A-110C. The block storage service 114 also identifies an order in which the data blocks 124 are used for booting the VM instances 110A-110C.

In the example of FIG. 1A, for each of the VM instances 110A-110C, the VM image 118 is used to create the VM instance, and the data blocks A, P, B, and R are used to boot the VM instance. Thus, as illustrated in FIG. 1A, the block storage service 114 transmits data 130 to the host computer 108A to create and boot each VM instance 110A-110C. The data 130 includes the VM image 118 (e.g., which is used to create the VM instance) and the data blocks A, P, B, and R (e.g., which are used to boot the VM instance).

Although not illustrated in FIG. 1A, other types of data can also be transmitted from the data store 112 to the host computer 108A during the creation and/or booting of the VM instances 110. For example, in addition to the data blocks A, P, B, and R, the VM instance 110A can also use data block Q during booting, and the instance 110C can also use data block C during booting. However, in an example, data 130 represents data blocks that are used by each of the VM instances 110A-110C during the boot process. In another example, data 130 represents data blocks that are used by at least two of the VM instances 110A-110C during the boot process.

In an example and as discussed above, the block storage service 114 identifies the data blocks (e.g., data blocks A, P, B, and R) used to boot the VM instances 110A-110C, and an order in which the data blocks are used to boot the VM instances 110A-110C. For example, during the boot process of each of the VM instances 110A-110C, the corresponding VM instance requests data blocks A, P. B, and R, in that order, from the data store 1120 via the block storage service 114. This implies that the data blocks A, P, B, and R are used, in that order, during booting each of the VM instances 110A-110C.

FIG. 1B illustrates the computer system architecture diagram 100 of FIG. 1A showing aspects of a mechanism for throughput and latency optimized volume initialization. As discussed with respect to FIG. 1A, the block storage service 114 (or another service or component) identifies that the data blocks A, P, B, and R are used, in that order, during booting of each of the VM instances 110A-110C. In FIG. 1B, a load order document 122 is also generated and stored in the data store 112. In an example, the load order document 122 identifies the data blocks A, P. B, and R (i.e., the load order document 122 identifies the data blocks that are used by the VM instances 110A-110C for booting). In an example, the load order document 122 also identifies an order in which the data blocks A, P. B, and R are used for booting the VM instances 110A-110C.

In an example, the load order document 122 identifies only those data blocks that are used for the boot process by the VM instances created from the VM image 118. If a specific data block, e.g., data block C, is used by a first VM instance (e.g., VM instance 110A) for the boot process, but is not used by a second VM instance (e.g., VM instance 110B) for the boot process, then the data block C might not be included in the load order document 122. However, in another example, if a data block is used for the boot process by at least one VM instance associated with the VM image 118, then such a data block is identified by the load order document 122.

In yet another example, the load order document 122 identifies only those data blocks that are predicted, with reasonable confidence, to be used for the boot process by one or more VM instances 110 that are to be created in future from the VM image 118. Such data blocks are identified by monitoring the boot process of one or more VM instances created from the VM image 118 in the past in the manner described above.

In an example, the load order document 122 is uniquely associated with the VM image 118. For example, the load order document 122 identifies the data blocks used for booting VM instances 110 that are specifically created from the VM image 118. In an example and as illustrated in FIG. 1B, the load order document 122 is stored within the manifest 120. However, in another example (not illustrated in FIG. 1B), the load order document 122 can be stored external to the manifest 120. In such an example, the manifest 120 can reference the load order document 122.

In some implementations, the load order document 122 includes one or more structured text files that identify the data blocks A, P, B, and R in that order. For example, the load order document 122 can be a text file that is formatted in accordance with an available structured language, such as JavaScript Object Notation ("JSON") or the extensible markup language ("XML").

In an example, the load order document 122 is generated by the block storage service 114, based on the block storage service 114 identifying the data blocks A, P, B, and R used for booting the VM instances 110A-110C (e.g., as discussed with respect to FIG. 1A). For example, the block storage service 114 generates and stores the load order document 122 within the manifest 120. In another example, the load order document 122 is generated by another appropriate service or component within the service provider network 102.

Subsequent to (or in parallel with) the generation of the load order document 122, in an example, data blocks identified within the load order document 122 are coalesced to form a coalesced boot volume 126, as illustrated in FIG. 1B. The coalesced boot volume 126, for example, is a concatenation of the data blocks A, P, B, and R, as identified in the load order document 122. The data blocks A, P, B, and R are concatenated, combined or coalesced, in that order, to form the coalesced boot volume 126. In the example of FIGS. 1A and 1B, the data blocks C and Q are not used by one or more of the VM instances 110A-110C for the boot process, and accordingly, the data blocks C and Q can be excluded from the load order document 122 and the coalesced boot volume 126, as illustrated in FIG. 1B.

In an example, the data blocks A, P, B, and R are stored sequentially in the data store 112 to form the coalesced boot volume 126. In an example (e.g., where the coalesced boot volume 126 is stored within a magnetic storage drive), the data blocks A, P, B, and R are linearly written in the storage drive and sequentially accessed. For example, the load order document 122 can include a sequential mapping of the data blocks A, P, B, and R stored within a magnetic storage device. In another example (e.g., where the coalesced boot volume 126 is stored within a solid state storage drive), the data blocks A, P, B, and R can be randomly stored within the storage drive, but accessed sequentially from the storage drive.

In an example, the load order document 122 can index the data blocks within the coalesced boot volume 126. For example, the load order document 122 can include a first index that points to a location of a first data block (e.g., data block A) of the coalesced boot volume 126 within a storage drive. The load order document 122 can also include a first offset by which a second data block (e.g., data block P) of the coalesced boot volume 126 is offset with respect to the first data block within the storage drive. Similarly, the load order document 122 can also include a second offset by which a third data block (e.g., data block B) of the coalesced boot volume 126 is offset with respect to the first data block within the storage drive, and so on.

In an example, the coalesced boot volume 126 is compressed, de-duplicated, and/or encrypted, prior to being stored in the data store 112. For example, individual data blocks A, P, B, and R can be compressed, de-duplicated, and/or encrypted, prior to being coalesced to form the coalesced boot volume 126. In another example, the data blocks A, P, B, and R can be first coalesced, and then the coalesced data blocks can be compressed and/or encrypted to form the coalesced boot volume 126.

FIG. 1C illustrates the computer system architecture diagram 100 of FIGS. 1A and 1B, showing aspects of using the coalesced boot volume 126 for optimized boot volume retrieval during booting of VM instances. As discussed with respect to FIG. 1B, the load order document 122 identifies the data blocks A, P, B, and R, i.e., identifies the data blocks that are used by the VM instances 110A-110C (e.g., VM instances which are created from the VM image 118) for booting. In an example, the coalesced boot volume 126 coalesces the data blocks A, P, B, and R.

In FIG. 1C, a VM instance 110D is created from the VM image 118. Although FIG. 1C illustrates the VM instance 110D being created in the host computer 108A, in another example, the VM instance 110D can be created in another host computer (e.g., host computer 108B).

In an example, when a request is received to instantiate the VM instance 110D, the block storage service 114 can begin retrieving blocks 124 of the coalesced boot volume 126 in the order specified by the load order document 122. The block storage service 114 can receive the blocks 124 and store the blocks even prior to receiving a request for the blocks 124 from the VM instance 110D. Ideally, the block storage service 114 would obtain the entire coalesced boot volume 126 prior to receiving requests from the VM instance 110D. However, the block storage service 114 can begin processing requests for the blocks 124 received from the VM instance 110D even when the entire coalesced boot volume 126 has not been received.

As discussed above, in an example the coalesced boot volume 126 is compressed, de-duplicated, and/or encrypted while being stored in the data store 112. In this example, the block storage service 114 decompresses and/or decrypts the coalesced boot volume 126, prior to transmitting the coalesced boot volume 126 to the host computer 108A for booting the VM instance 110D. In another example, such decompression and/or decryption can be performed by the host computer 108A or by the newly created VM instance 110D.

The coalesced boot volume 126 can be streamed from the data store 112 to the block storage service 114 for use in responding to requests received from the VM instance 110D for the blocks 110. For example, as soon as the block storage service 114 receives at least a first section of the coalesced boot volume 126, the VM instance 110D can access the data block A from the first section of the coalesced boot volume 126. The VM instance 110D can start the boot process based on the data block A, while the block storage service 114 continues receiving subsequent sections of the coalesced boot volume 126. As and when new data blocks (e.g., data blocks P, B, etc.) are received as a part of the coalesced boot volume 126, the VM instance 110D can retrieve such data blocks from the block storage service 114 and continue the boot process.

In an example, tens, hundreds, or even thousands of VM instances can be created simultaneously, near simultaneously, or at rapid succession from a single VM image, e.g., the VM image 118. To facilitate booting of such a large number of VM instances, multiple instances of the block storage service 114 can transmit the coalesced boot volume 126 to the VM instances. However, accessing the data store 112 by many such instances of the block storage service 114 can be time consuming and/or can create congestion at the data store 112. In an example, to alleviate such problems, the different instances of the block storage service 114 can transmit and share the coalesced boot volume 126 among themselves. Such sharing can be achieved, for example, by using an appropriate peer-to-peer file sharing mechanism, such as BitTorrent® or another peer-to-peer file sharing mechanism.

As previously discussed, the load order document 122 is uniquely associated with the VM image 118. For example, the load order document 122 identifies the data blocks that are likely to be used to boot VM instances that are created from the VM image 118. In an example, the VM image 118 can be updated, e.g., as and when newer versions of the VM image 118 become available. Any change in the VM image 118 can result in a change in the data blocks that are used to boot VM instances created from the VM image 118. In an example, the block storage service 114 continues monitoring the data blocks needed for booting the VM instances created from the VM image 118, e.g., even when the block storage service 114 transmits the coalesced boot volume 126 for the boot process. For example, referring to FIG. 1C, the block storage service 114 transmits the coalesced hoot volume 126 for the boot process of the VM instance 110D. In an example, in addition to the data blocks included in the coalesced boot volume 126, the VM instance 110D requests data block Q for the boot process.

Also, assume that the data block Q is requested by one or more subsequent VM instances created from the VM image 118. In such a case, the load order document 122 can be updated to include the data block Q, and the coalesced boot volume 126 can also be updated to include the data block Q. That is, the load order document 122 and the coalesced boot volume 126 can be dynamically updated as and when new information is available on the data blocks used to boot VM instances created from the VM image 118 (or for example, an updated version of the VM image 118 is used).

Generating the coalesced boot volume 126 and transmitting the coalesced boot volume 126 to the VM instance 110D (e.g., instead of transmitting the data blocks A, P, B, and R individually to the VM instance 110D) has several advantages. For example, each time the data store 112 is accessed to retrieve a data block, there is a fixed cost (e.g., in terms of time to access the data store 112 and/or resources utilized to access the data store 112) associated with such an access. This fixed cost is irrespective of a size of the data block to be accessed.

Although FIGS. 1A-ID illustrate only four data blocks (e.g., data blocks A, P, B, and R) used for booting a VM instance, in reality, hundreds, or even thousands of such data blocks have to be accessed during booting a VM instance. If such a large number of data blocks are to be individually accessed from the data store 112 and transmitted to the VM instance 110D during booting the VM instance 100D, a summation of the fixed costs associated with accessing each of the individual data blocks would be relatively large. For example, and without limitation, a connection to the data store 112 needs to be established by the block storage service 114 for each of the blocks 110.

In contrast, as disclosed herein, streaming the blocks 110 of the coalesced boot volume 126 to the block storage service 114 eliminates many of the fixed costs. That is, the fixed cost is paid only once (e.g., while retrieving the coalesced boot volume 126) and yet, all the data blocks 110 for the boot process can be retrieved. This can dramatically decreases the fixed cost associated with retrieving data blocks for booting the VM instance 110D. Furthermore, the booting of the VM instance 110D is faster, as all the data blocks are received in the order in which they are likely to be used for booting.

Figure 2:
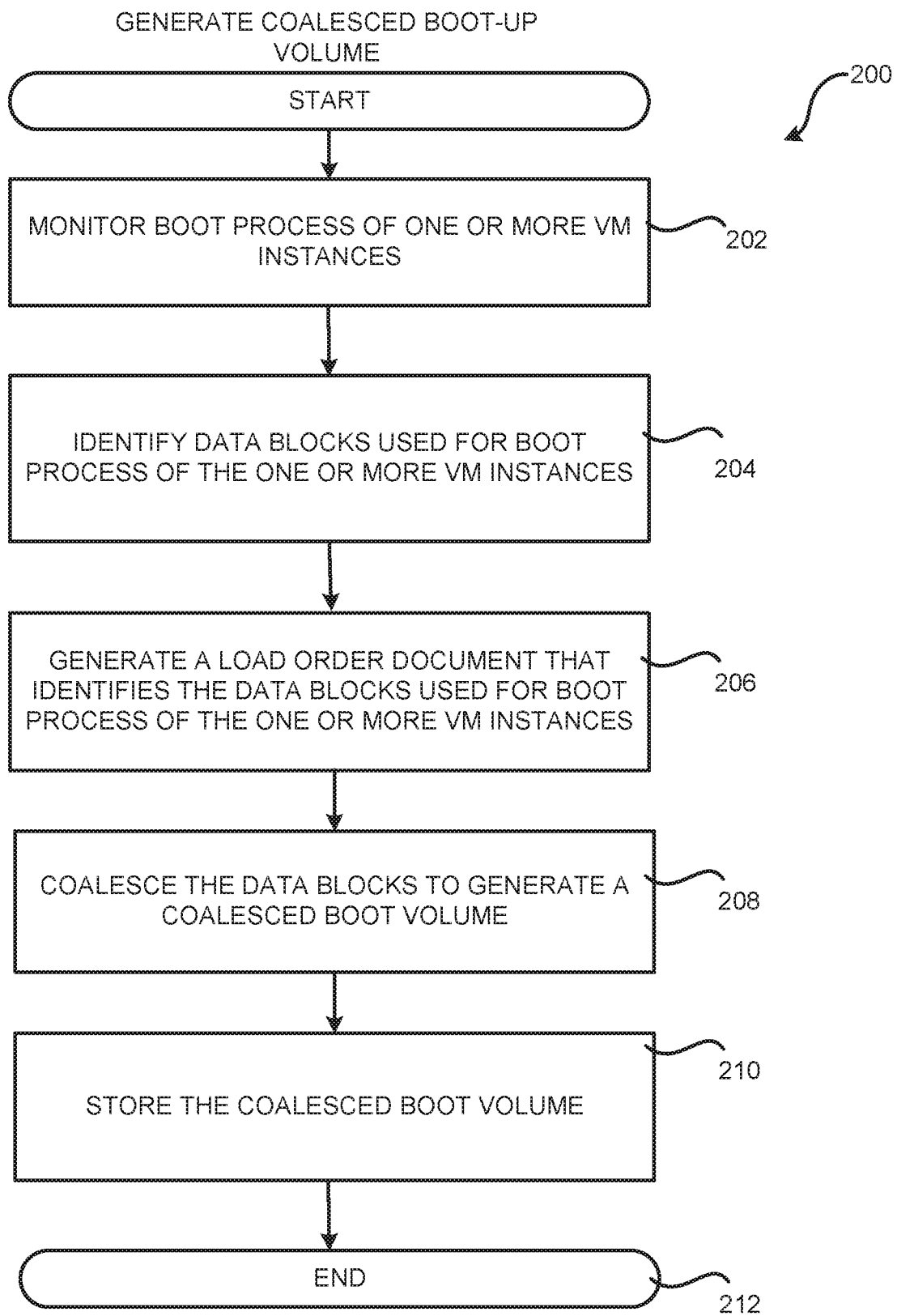
FIG. 2 is a flow diagram showing a routine that illustrate aspects of the operation of several mechanisms disclosed herein for throughput and latency optimized volume initialization, according to one configuration disclosed herein.

FIG. 2 is a flow diagram showing a routine 200 that illustrates aspects of the operation of one mechanism disclosed herein for generating a coalesced storage volume, according to one configuration disclosed herein. It should be appreciated that the logical operations described herein with respect to FIG. 2, and the other figures FIG. 3 discussed below), can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the boot process of one or more VM instances (e.g., VM instances 110A-110C) is monitored. The one or more VM instances are, for example, created from a same VM image, e.g., VM image 118 of FIG. 1A. The monitoring can be performed by the block storage service 114, or by another network service or other type of component operating in the service provider network 102.

The routine 200 then proceeds from operation 202 to 204, where the block storage service 114 (or another appropriate component of the service provider network 102) identifies data blocks (e.g., data blocks A, P, B, and R) used for the boot process of the one or more VM instances. In an example, the block storage service 114 also identifies an order in which the data blocks are used for the boot process.

The routine 200 then proceeds from operation 204 to 206, where the block storage service 114 (or another appropriate component of the service provider network 102) generates a load order document 122, and stores the load order document 122 in the data store 112. In an example, the load order document 122 is stored within a manifest, as illustrated in FIG. 1B. In another example, the load order document 122 is stored external to the manifest, but the manifest includes a reference to the load order document 122. As discussed above, the load order document 122 identifies the data blocks that are used for the boot process of the one or more VM instances 110. In an example, the load order document 122 also identifies an order in which the data blocks are used for the boot process of the one or more VM instances 110.

The routine 200 then proceeds from operation 206 to 208, where the object storage service 128 or block storage service 114 (or another appropriate component of the service provider network 102) coalesces the data blocks identified in the load order document to generate a coalesced boot volume (e.g., the coalesced boot volume 126). Thus, for example, the load order document 112 identifies the data blocks that are to be included in the coalesced boot volume 126, and also identifies the order in which the data blocks are to be arranged. Based on the load order document 112, the identified data blocks are arranged and coalesced in the identified order to generate the coalesced boot volume 126.

The routine 200 then proceeds from operation 208 to 210, where the object storage service 128 or the block storage service 114 (or another appropriate component of the service provider network 102) stores the coalesced boot volume 126 in the data store 112. Such coalescing and storing can be performed, for example, by concatenating the data blocks, by sequentially writing the data blocks in a storage drive, by mapping the data blocks stored in the storage drive such that the data blocks appear to an accessing device as being stored linearly in the storage drive, and/or the like. The routine 200 ends at operation 212.

Figure 3:
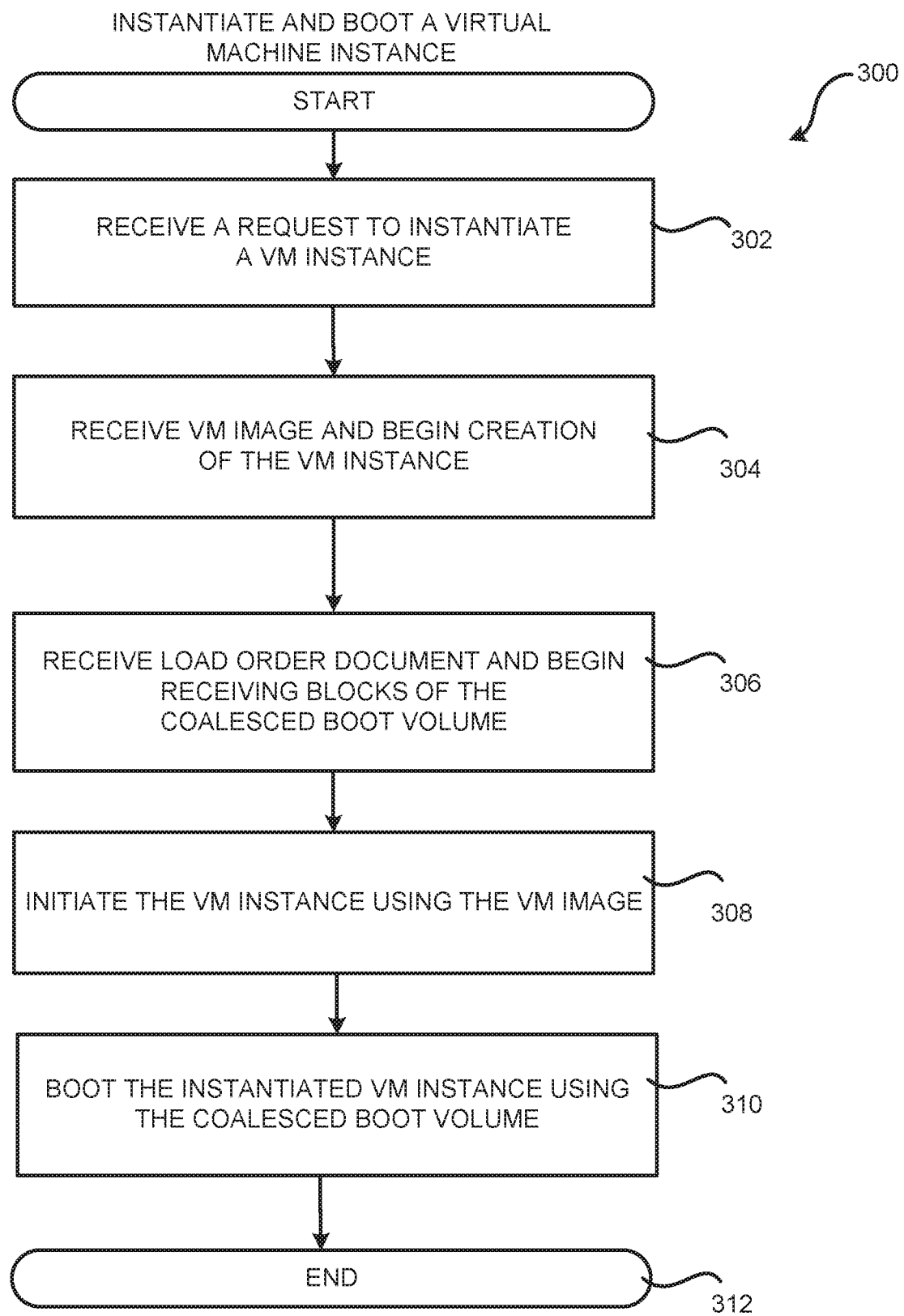
FIG. 3 is a flow diagram showing a routine that illustrate aspects of the operation of several mechanisms disclosed herein for booting a VM instance using a coalesced boot volume, according to one configuration disclosed herein.

FIG. 3 is a flow diagram showing a routine 300 that illustrates aspects of the operation of one mechanism disclosed herein for booting a VM instance using a coalesced boot volume. The routine 300 begins at operation 302, where a request to instantiate a VM instance 110 (e.g., the VM instance 110D of FIG. 1C) is received at a host (e.g., the host 110A).

The routine 300 then proceeds from operation 302 to 304, where various tasks are performed in order to instantiate the new VM instance. For example, and without limitation, a network connection for the new VM instance can be created, metadata associated with the VM can be created, and credentials for accessing the new VM instance can be created. Additionally, and as described below, the block storage service 114 can begin loading the data blocks 124 of the coalesced boot volume 126 from the object storage service 128 in anticipation of receiving requests from the new VM instance for the blocks. Other types of operations can also be performed in order to create the new VM instance. As a result, there is a delay between the time a request to instantiate a new VM instance is received, and the time that the new VM instance begins booting and requesting data blocks of the coalesced boot volume 124 from the block storage service 114.

The routine 300 then proceeds from operation 304 to 306, where the block storage service 114 receives the load order document 122. The block storage service 114 then begins streaming the blocks 124 of the coalesced boot volume 126 from the object storage service 128 in the order specified by the load order document 122. The block storage service 114 also exposes a volume to the new VM instance for use in booting. As discussed above, the block storage service 114 can begin responding to requests from the VM instance for the blocks in the coalesced boot volume 126 before the entire boot volume has been retrieved.

The routine 300 then proceeds from operation 306 to operation 308, where the new VM instance is instantiated. Once the new VM instance has been instantiated, the routine 300 proceeds from operation 308 to 310, where the instantiated VM instance 110D is booted using on the coalesced boot volume 126. For example, the VM instance 110D can request individual data blocks 124 in the coalesced boot volume 126 from the block storage service 114. The order in which the VM instance 110D accesses data blocks 124 from the coalesced boot volume 126 should be the same as or similar to the sequence of blocks 124 specified in the load order document 122.

It is to be noted that although the operation 308 is illustrated subsequent to the operation 306 in FIG. 3, in an example, the operation 308 can be executed prior to or at least partially concurrently with the operation at 306. That is, the block storage service 114 can retrieve the load order document 122 and begin streaming blocks 124 of the coalesced boot volume 126 while the VM instance HOD is being instantiated, or even prior to the VM instance 110D being instantiated. The routine 300 ends at operation 312.

Figure 4:
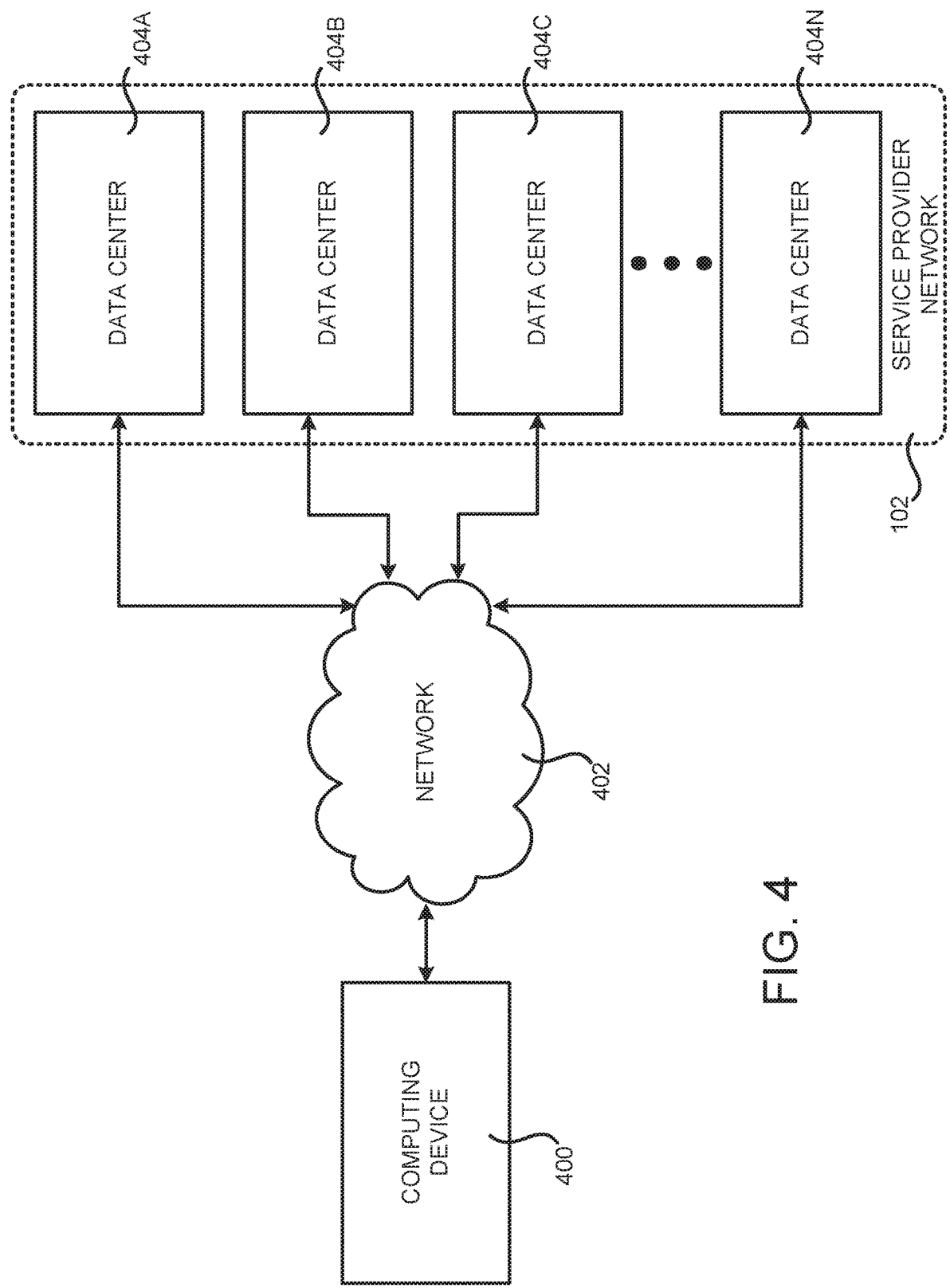
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to provide functionality in the manner described above, according to one configuration disclosed herein. As discussed above, the service provider network 102 can provide computing resources, like VM instances 110, on a permanent or an as-needed basis. Among other types of functionality, the computing resources provided by the service provider network 102 can be utilized coalesce boot volumes for optimized boot volume retrieval. The computing resources provided by the service provider network 102 can include various types of computing resources, such as data processing resources like VM instances 110, data storage resources, networking resources, data communication resources, network services, and the like.

Each type of computing resource provided by the service provider network 102 can be general-purpose or might be available in a number of specific configurations. For example, data processing resources can be available as physical computers or VM instances 110 in a number of different configurations. The VM instances 110 can be configured to execute applications, including web servers, application servers, media servers, database servers, some or all of the services described above, and/or other types of programs. Data storage resources can include file storage devices, block storage devices, and the like. The service provider network 102 might also be configured to provide other types of computing resources not mentioned specifically herein.

The computing resources provided by the service provider network 102 are enabled in one implementation by one or more data centers 404A-404N (which might be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 might also be located in geographically disparate locations. One illustrative configuration for a data center 404 that might be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 400 operated by a customer or other user of the service provider network 102 might be utilized to access the service provider network 102 by way of the network 402. It should be appreciated that a local-area network ("LAN"), the Internet, or any other networking topology known in the art that connects the data centers 404 to remote customers and other users might be utilized. It should also be appreciated that combinations of such networks might also be utilized.

Figure 5:
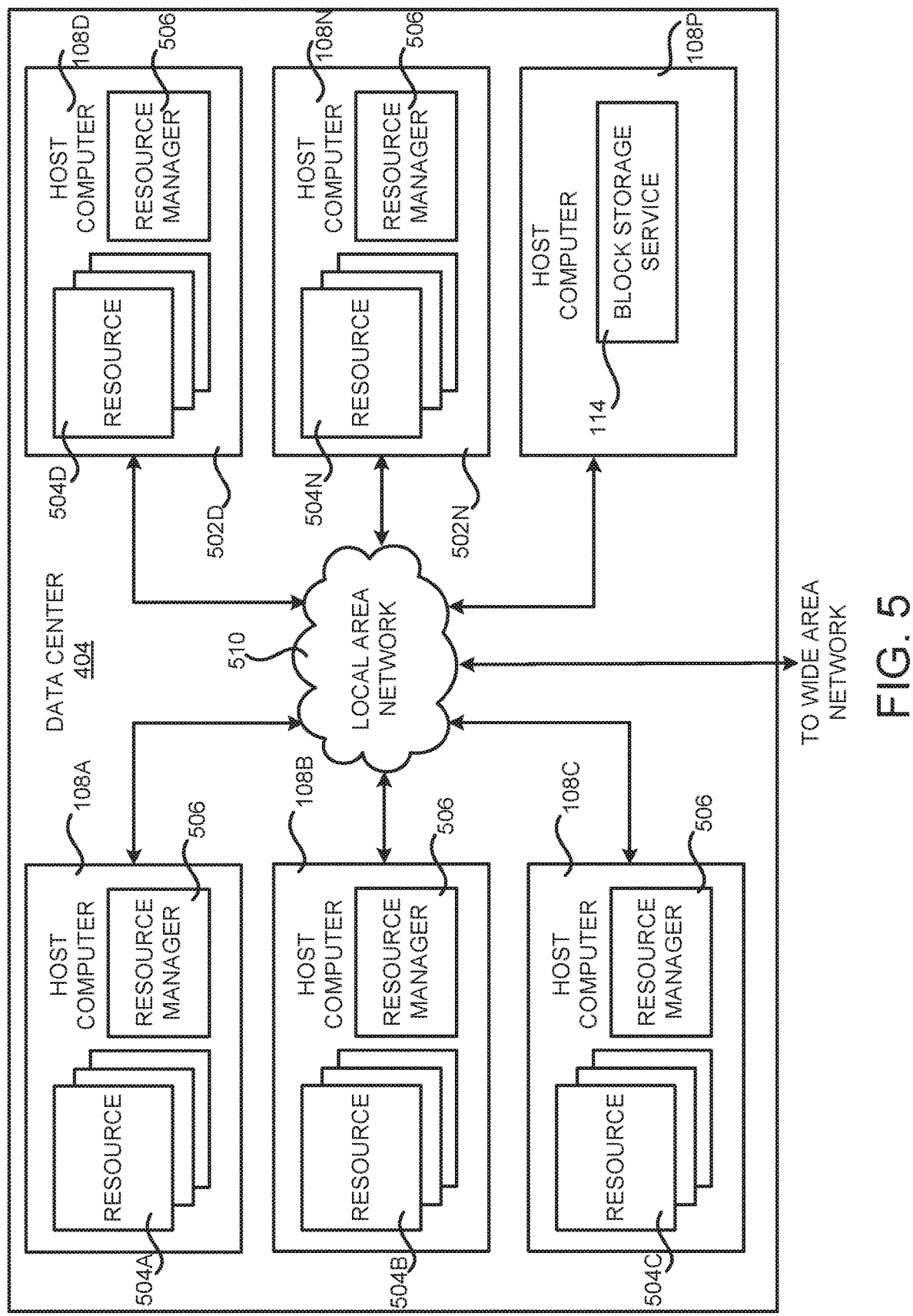
FIG. 5 is a computing system diagram illustrating a configuration for a data center that can be utilized to implement aspects of the technologies disclosed herein.

FIG. 5 is a computing system diagram that illustrates one configuration for a data center 404 that implements aspects of the technologies disclosed herein for coalescing boot volumes for optimized boot volume retrieval. The example data center 404 shown in FIG. 5 includes several host computers 108A-108N and 108P for providing computing resources 504A-504N.

The host computers 108 can be standard tower, rack-mount, or blade server computers configured appropriately for providing the computing resources described herein (illustrated in FIG. 5 as the computing resources 504A-504N). As mentioned above, the computing resources provided by the service provider network 102 might be data processing resources such as VM instances 110 or hardware computing systems, data storage resources, database resources, networking resources, and others. Some of the host computers 108 might also be configured to execute a resource manager 506 capable of instantiating and/or managing the computing resources. In the case of VM instances 110, for example, the resource manager 506 might be a hypervisor or another type of program configured to enable the execution of multiple VM instances 110 on a single host computer 108. Host computers 108 in the data center 404 might also be configured to provide network services and other types of services, some of which are described in detail below with regard to FIG. 6.

The example data center 404 shown in FIG. 5 can further include the block storage service 114 of FIGS. 1A-1C executing on a host computer 108P. The block storage service 114 can provide various functionality discussed with respect to FIGS. 1A-1C, e.g., monitor data blocks used for booting VM instances, generating a load order document, generating a coalesced boot volume, transmitting the load order document and the coalesced boot volume to facilitate booting of a VM instance, etc.

In the example data center 404 shown in FIG. 5, an appropriate LAN 510 is also utilized to interconnect the host computers 108 and the block storage service 114. The LAN 510 is also connected to the network 402 illustrated in FIG. 4. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 404A-404N, between each of the host computers 108 in each data center 404, and, potentially, between computing resources in each of the data centers 404. It should be appreciated that the configuration of the data center 404 described with reference to FIG. 5 is merely illustrative and that other implementations might be utilized.

Figure 6:
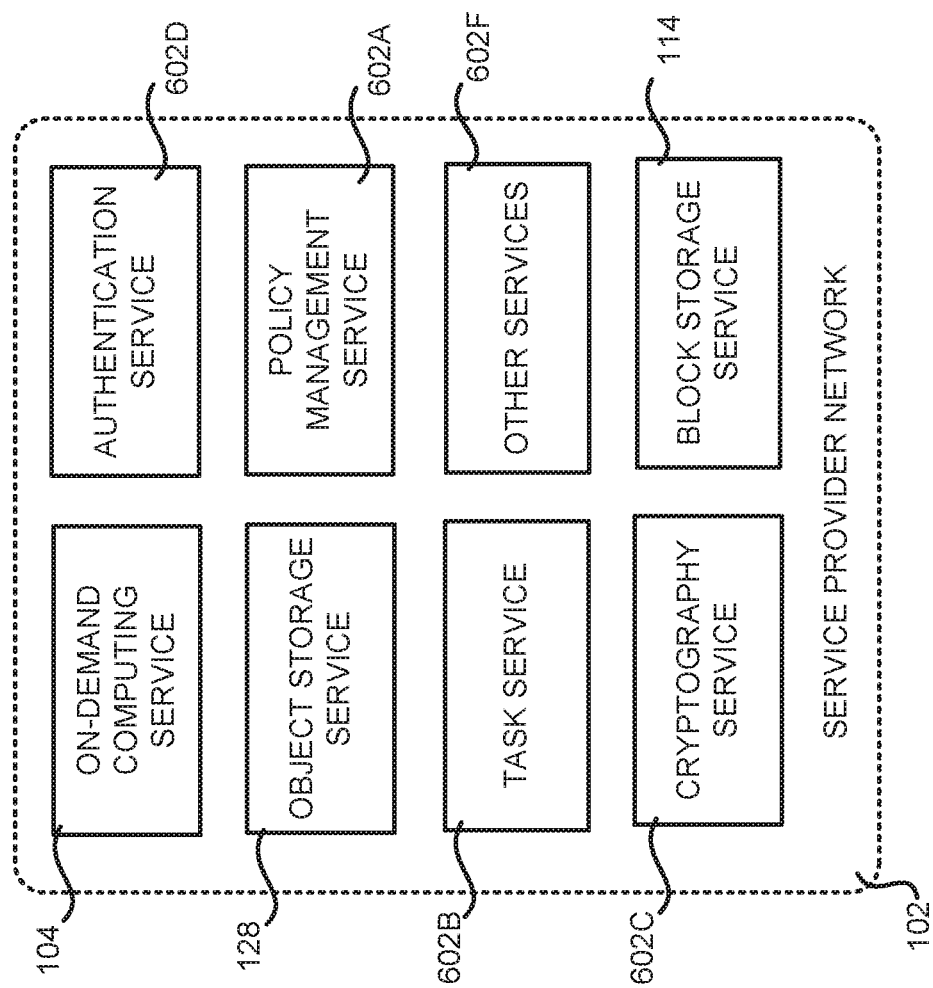
FIG. 6 is a system and network diagram that shows aspects of several services that might be provided by and utilized within a service provider network in one configuration disclosed herein.

FIG. 6 is a system and network diagram that shows aspects of several network services that might be provided by and utilized within a service provider network 102 in one configuration disclosed herein. In particular, the service provider network 102 can provide a variety of network services to customers and other users of the service provider network 102 including, but not limited to, the on-demand computing service 104. The service provider network 102 might also provide other types of services including, but not limited to, the object storage service 128, the block storage service 114, a policy management service 602A, a task service 602B, a cryptography service 602C, and/or an authentication service 602D, each of which is described in greater detail below. Additionally, the service provider network 102 might also provide other services 602F, some of which are described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 402 shown in FIG. 4. Communications from a customer computing device, such as the computing device 400 shown in FIG. 4, to the service provider network 102 can cause the services provided by the service provider network 102 to operate in accordance with the described configurations or variations thereof.

It is noted that not all configurations described include the services described with reference to FIG. 6 and that additional services can be provided in addition to or as an alternative to services explicitly described. Each of the services shown in FIG. 6 might also expose web service interfaces that enable a caller to submit appropriately configured API calls to the various services through web service requests. In addition, each of the services can include service interfaces that enable the services to access each other (e.g., to enable a virtual computer system provided by the on-demand computing service 104 to store data in or retrieve data from the object storage service 128). Additional details regarding some of the services shown in FIG. 6 will now be provided.

As discussed above, the on-demand computing service 104 can be a collection of computing resources configured to instantiate VM instances 110 and to provide other types of computing resources on demand. For example, a customer or other user of the service provider network 102 can interact with the on-demand computing service 104 (via appropriately configured and authenticated API calls) to provision and operate VM instances 110 that are instantiated on physical computing devices hosted and operated by the service provider network 102. The VM instances 110 can be used for various purposes, such as to operate as servers supporting a web site, to operate business applications or, generally, to serve as computing resources for the customer. Other applications for the VM instances 110 can be to support database applications, electronic commerce applications, business applications and/or other applications. Although the on-demand computing service 104 is shown in FIG. 6, any other computer system or computer system service can be utilized in the service provider network 102, such as a computer system or computer system service that does not employ virtualization and instead provisions computing resources on dedicated or shared computers/servers and/or other physical devices.

The object storage service 128 might include software and computing resources that collectively operate to store data using block or file-level storage devices (and/or virtualizations thereof). The storage devices of the object storage service 128 might, for instance, be operationally attached to virtual computer systems provided by the on-demand computing service 104 to serve as logical units (e.g., virtual drives for the computer systems. A storage device might also enable the persistent storage of data used/generated by a corresponding virtual computer system where the virtual computer system service might only provide ephemeral data storage.

The service provider network 102, in various configurations, is also configured with a task service 602B, The task service 602B is configured to receive a task package and to enable executing tasks as dictated by the task package. The task service 602B can be configured to use any resource of the service provider network 102, such as instantiated virtual machines or virtual hosts, for executing the task. The task service 602B can configure the instantiated virtual machines or virtual hosts to operate using a selected operating system and/or a selected execution application in accordance with specified requirements.

The service provider network 102 can also include a cryptography service 602C. The cryptography service 602C can utilize storage services of the service provider network 102, such as the object storage service 128, to store encryption keys in encrypted form, whereby the keys can be usable to decrypt customer keys accessible only to particular devices of the cryptography service 602C. The cryptography service 602C might also provide other types of functionality not specifically mentioned herein.

As illustrated in FIG. 6, the service provider network 102, in various configurations, also includes a policy management service 602A and an authentication service 602D. The policy management service 602A, in one example, is a network service configured to manage policies on behalf of customers or internal users of the service provider network 102. The policy management service 602A can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The authentication service 602D, in one example, is a computer system (i.e., collection of computing resources configured to perform operations involved in authentication of users. For instance, one of the services 602 shown in FIG. 6 can provide information from a user to the authentication service 120 to receive information in return that indicates whether or not the requests submitted by the user are authentic.

The service provider network 102 can additionally maintain other services 602F based, at least in part, on the needs of its customers. For instance, the service provider network 102 can maintain a database service, which can be a collection of computing resources that collectively operate to create, maintain, and allow queries to be performed on databases stored within the service provider network 102. For example, a customer or other user of the service provider network 102 can operate and manage a database from the database service by utilizing appropriately configured network API calls. This, in turn, can allow the customer to maintain and potentially scale the operations in the database. Other services include object-level archival data storage services, and services that manage, monitor, interact with, or support other services. The service provider network 102 might also be configured with other services not specifically mentioned herein in other configurations.

Figure 7:
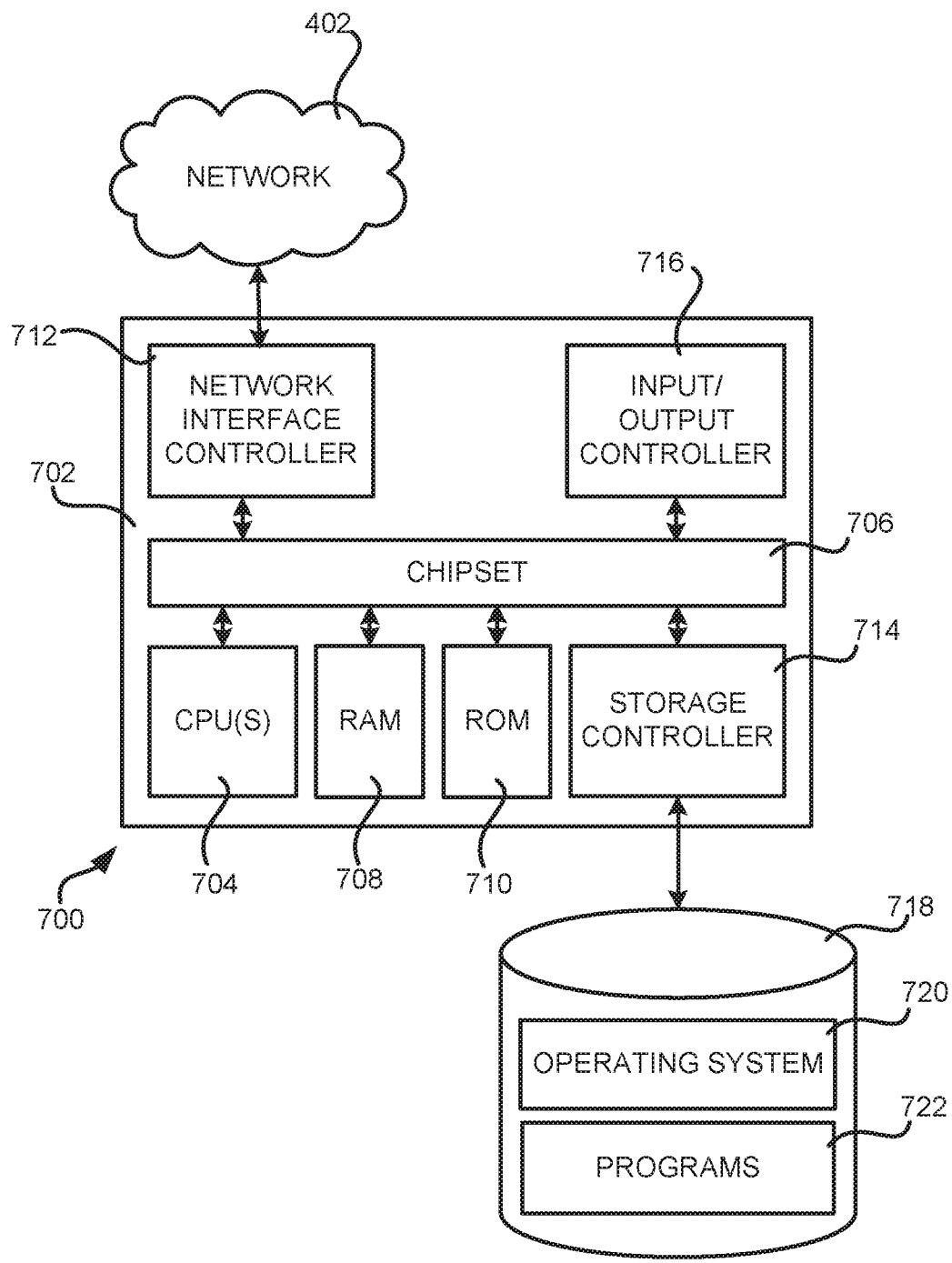
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 402. The chipset 706 can include functionality for providing network connectivity through a NIC 712, such as a gigabit Ethernet adapter. The NIC 712 is capable of connecting the computer 700 to other computing devices over the network 402. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system is the LINUX operating system. According to another configuration, the operating system is the WINDOWS® SERVER operating system from MICROSOFT Corporation. According to further configurations, the operating system can be the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions Which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 2-3. The computer 700 might also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies for coalescing data blocks to generate a coalesced boot volume for optimized boot volume retrieval within a service provider network have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method comprising:
    monitoring boot processes of respective virtual machine instances created from a virtual machine image;
    identifying a plurality of data blocks used in common by the boot processes when booting the virtual machine created from the virtual machine image;
    identifying an order in which the plurality of data blocks are used by the boot processes of the virtual machine instances;
    identifying one or more additional data blocks used by less than all of the boot processes when booting the virtual machine instances created from the virtual machine image;
    coalescing the plurality of data blocks to generate a coalesced boot volume corresponding to the virtual machine image, wherein the plurality of data blocks are coalesced in the coalesced boot volume in the order in which the plurality of data blocks are used by the boot processes of the virtual machine instances;
    storing the coalesced boot volume within an object storage service;
    streaming the plurality of data blocks as the coalesced boot volume in the order used by the boot processes of the virtual machine instances from the object storage service to a block storage service configured to expose the coalesced boot volume to a first virtual machine instance to be created from the virtual machine image; and
    transmitting the one or more additional data blocks to the block storage service.

2. The computer-implemented method of claim 1, further comprising generating a load order document that identifies the plurality of data blocks used for the boot processes of the virtual machine instances, wherein the load order document further identifies the order in which the plurality of data blocks are used by the boot processes.

3. The computer-implemented method of claim 2, wherein coalescing the plurality of data blocks comprises coalescing the plurality of data blocks based, at least in part, on the load order document.

4. The computer-implemented method of claim 1, further comprising:
receiving a request to create the first virtual machine instance; and
beginning to initialize the first virtual machine instance using ones of the plurality of data blocks in the coalesced boot volume, while the streaming provides others of the plurality of data blocks to the block storage service.

5. The computer-implemented method of claim 1, further comprising:
monitoring a boot process of the first virtual machine instance;
determining that the first virtual machine instance uses a first data block during the boot process of the first virtual machine instance, wherein the first data block is not included within the coalesced boot volume;
coalescing the plurality of data blocks and the first data block to generate a second coalesced boot volume; and
transmitting the second coalesced boot volume to facilitate booting a different virtual machine instance using the second coalesced boot volume.

6. The computer-implemented method of claim 1, further comprising:
transferring the coalesced boot volume from the first block storage service to a second block storage service configured to expose the coalesced boot volume to a second virtual machine instance; and
booting the first virtual machine instance from the first block storage service and the second virtual machine instance from the second block storage service using the coalesced boot volume.

7. The computer-implemented method of claim 1, further comprising compressing or encrypting the plurality of data blocks prior to storing the coalesced boot volume within the object storage service.

8. A non-transitory computer-readable storage medium having computer-executable instructions stored thereupon which, when executed by a computer, cause the computer to:
monitor boot processes of respective virtual machine instances created from a virtual machine image;
identify a plurality of data blocks used by all the boot processes when booting the virtual machine instances created from the virtual machine image;
identify an order in which the plurality of data blocks are used by the boot processes of the virtual machine instances;
identify one or more additional data blocks used by a subset of the boot processes when booting the virtual machine instances created from the virtual machine image;
coalesce the plurality of data blocks to generate a coalesced boot volume corresponding to the virtual machine image, wherein the plurality of data blocks are coalesced in the coalesced boot volume in the order in which the plurality of data blocks are used by the boot processes of the virtual machine instances;
store the coalesced boot volume within an object storage service;
stream the plurality of data blocks as the coalesced boot volume in the order used by the boot processes of the virtual machine instances from the object storage service to a first block storage service for use in booting a first virtual machine instance to be created from the virtual machine image; and
transmit the one or more additional data blocks to the block storage service.

9. The non-transitory computer-readable storage medium of claim 8, wherein the instructions further cause the computer to generate a load order document that identifies the plurality of data blocks used by the boot processes of the virtual machine instances, and wherein the plurality of data blocks are coalesced based, at least in part, on the load order document.

10. The non-transitory computer-readable storage medium of claim 9, wherein the load order document further identifies the order in which the plurality of data blocks are used by the boot processes of the virtual machine instances, and wherein the plurality of data blocks are coalesced in the coalesced boot volume in the order in which the plurality of data blocks are used by the boot processes based, at least in part, on the load order document.

11. The non-transitory computer-readable storage medium of claim 8, wherein the instructions further cause the computer to:
monitor a boot process of another virtual machine instance; and
update the coalesced boot volume to generate an updated coalesced boot volume based, at least in part, on monitoring the boot process of the another virtual machine instance.

12. The non-transitory computer-readable storage medium of claim 11, wherein the instructions further cause the computer to update the coalesced boot volume by:
identifying a first data block used by the boot process of the another virtual machine instance, wherein the coalesced boot volume does not include the first data block; and
updating the coalesced boot volume to include the first data block in the updated coalesced boot volume.

13. The non-transitory computer-readable storage medium of claim 8, wherein the virtual machine instance and the first virtual machine instance are created from the virtual machine image.

14. The non-transitory computer-readable storage medium of claim 8, wherein the instructions further cause the computer to:
transfer the coalesced boot volume from the first block storage service to a second block storage service configured to expose the coalesced boot volume to a second virtual machine instance; and
boot the first virtual machine instance from the first block storage service and the second virtual machine instance from the second block storage service using the coalesced boot volume.

15. The non-transitory computer-readable storage medium of claim 8, wherein the instructions cause the computer to transmit the coalesced boot volume by:
receiving a request to create the first virtual machine instance; and
streaming the coalesced boot volume from the object storage service to the block storage service while initiating the first virtual machine instance.

16. The non-transitory computer-readable storage medium of claim 8, wherein the instructions further cause the computer to compress or encrypt the plurality of data blocks prior to storing the coalesced boot volume within the object storage service.

17. An apparatus, comprising:
a processor; and
a non-transitory computer-readable storage medium having instructions stored thereupon which are executable by the processor and which, when executed, cause the apparatus to:
monitor boot processes of respective virtual machine instances created from a virtual machine image;
identify a plurality of data blocks used in common by the boot processes when booting the virtual machine instances created from the virtual machine image;
identify an order in which the plurality of data blocks are used for the boot processes of the virtual machine instances;
identify one or more additional data blocks used by less than all of the boot processes when booting the virtual machine instances created from the virtual machine image;
coalesce the plurality of data blocks to generate a coalesced boot volume corresponding to the virtual machine image such that the plurality of data blocks within the coalesced boot volume are in the order in which the plurality of data blocks are used for the boot processes of the virtual machine instances;
store the coalesced boot volume within an object storage service; and
stream the plurality of blocks as the coalesced boot volume in the order used by the boot processes of the virtual machine instances from the object storage service, to a first block storage service, the first block storage service being configured to expose the coalesced boot volume to a first virtual machine instance for use in booting from the virtual machine image; and
transmit the one or more additional data blocks to the block storage service.

18. The apparatus of claim 17, wherein the instructions, when executed, further cause the apparatus to generate a load order document that identifies the plurality of data blocks used for the boot processes of the virtual machine instances, and wherein the load order document further identifies an order in which the plurality of data blocks are used during the boot processes.

19. The apparatus of claim 17, wherein the instructions, when executed, further cause the apparatus to:
receive a request to create the first virtual machine instance; and
begin to boot the first virtual machine instance using ones of the plurality of data blocks in the coalesced boot volume, while the streaming provides others of the plurality of data blocks to the block storage service.

20. The apparatus of claim 17, wherein the instructions, when executed, further cause the apparatus to compress or encrypt the plurality of data blocks prior to storing the coalesced boot volume within the object storage service.

* * * * *